United States Patent [19]

Baumeister et al.

[11] Patent Number: 5,140,207
[45] Date of Patent: Aug. 18, 1992

[54] ELECTRIC MOTOR, ESPECIALLY WIPER MOTOR FOR DRIVING A WINDSHIELD WIPER SYSTEM IN A MOTOR VEHICLE

[75] Inventors: Udo Baumeister, Bietigheim-Bissingen; Roland Bühler, Heilbronn, both of Fed. Rep. of Germany

[73] Assignee: SWF Auto-Electric GmbH, Bietigheim-Bissingen, Fed. Rep. of Germany

[21] Appl. No.: 445,608

[22] PCT Filed: Apr. 12, 1989

[86] PCT No.: PCT/EP89/00389

§ 371 Date: Dec. 13, 1989

§ 102(e) Date: Dec. 13, 1989

[87] PCT Pub. No.: WO89/10652

PCT Pub. Date: Nov. 2, 1989

[30] Foreign Application Priority Data

Apr. 19, 1988 [DE] Fed. Rep. of Germany ....... 3812996

[51] Int. Cl.⁵ .......................... H02K 7/10; H02K 5/10
[52] U.S. Cl. .......................... 310/83; 310/71; 310/88; 310/89
[58] Field of Search .................. 310/71, 83, 88, 89

[56] References Cited

U.S. PATENT DOCUMENTS

| 3,440,594 | 4/1969 | Hopp et al. | 310/71 |
| 4,398,135 | 8/1983 | Busch et al. | 310/71 |
| 4,572,979 | 2/1986 | Haar et al. | 310/71 |
| 4,614,886 | 9/1986 | Schneider et al. | 310/89 |
| 4,639,065 | 1/1987 | Kohler et al. | 310/83 |
| 4,727,274 | 2/1988 | Adam et al. | 310/71 |
| 4,866,317 | 9/1989 | Katayama | 310/89 |

FOREIGN PATENT DOCUMENTS

| 0154930 | 3/1985 | European Pat. Off. |  |
| 7115761 | 4/1971 | Fed. Rep. of Germany. |  |
| 2375738 | 7/1978 | France. |  |
| 0074942 | 4/1985 | Japan | 310/89 |

Primary Examiner—Steven L. Stephan
Assistant Examiner—Dennis R. Haszko
Attorney, Agent, or Firm—Robert P. Seitter; J. Gordon Lewis

[57] ABSTRACT

An electric motor, in particular a wiper motor for driving a windshield wiper system in a motor vehicle, which comprises a gear housing including a cover and several plug contacts, of which some are fixed on the gear housing, in particular on the cover, and at least another is connected with a motor current supply lead and fitted in a plug housing. In order to provide good protection of the plug contacts and the gear housing interior against dirt, the plug housing has an opening with a circumferential rim, through which the plug contacts fixed on the gear housing enter the plug housing. Furthermore the plug housing rests firmly against the gear housing around the opening.

14 Claims, 5 Drawing Sheets

FIG I

FIG 2
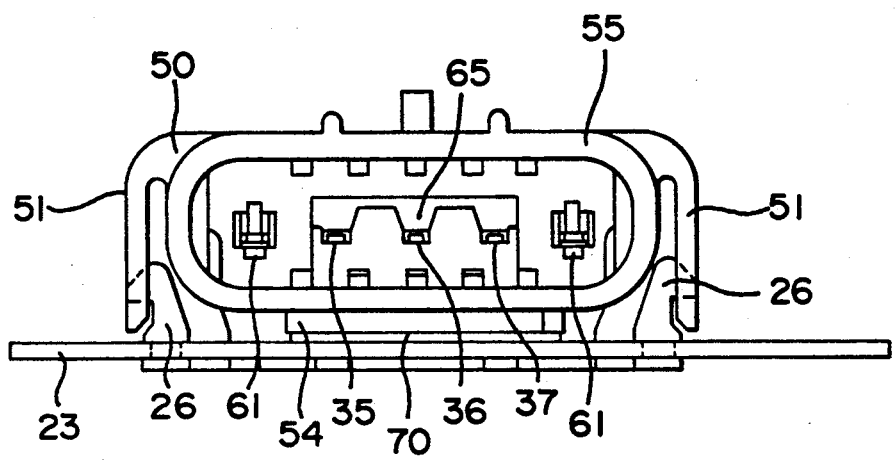
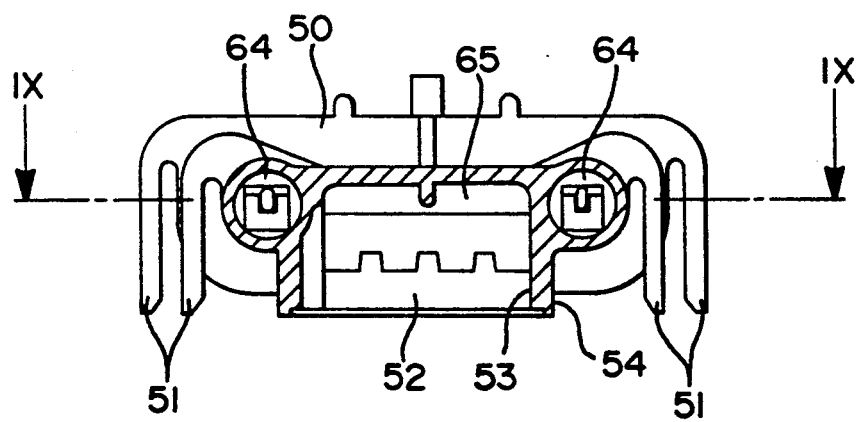
FIG 7

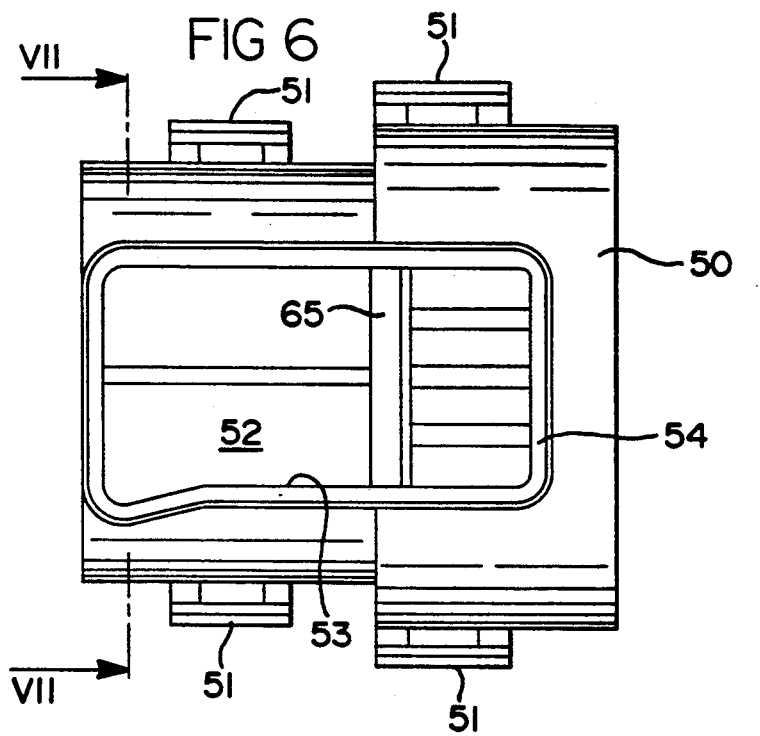
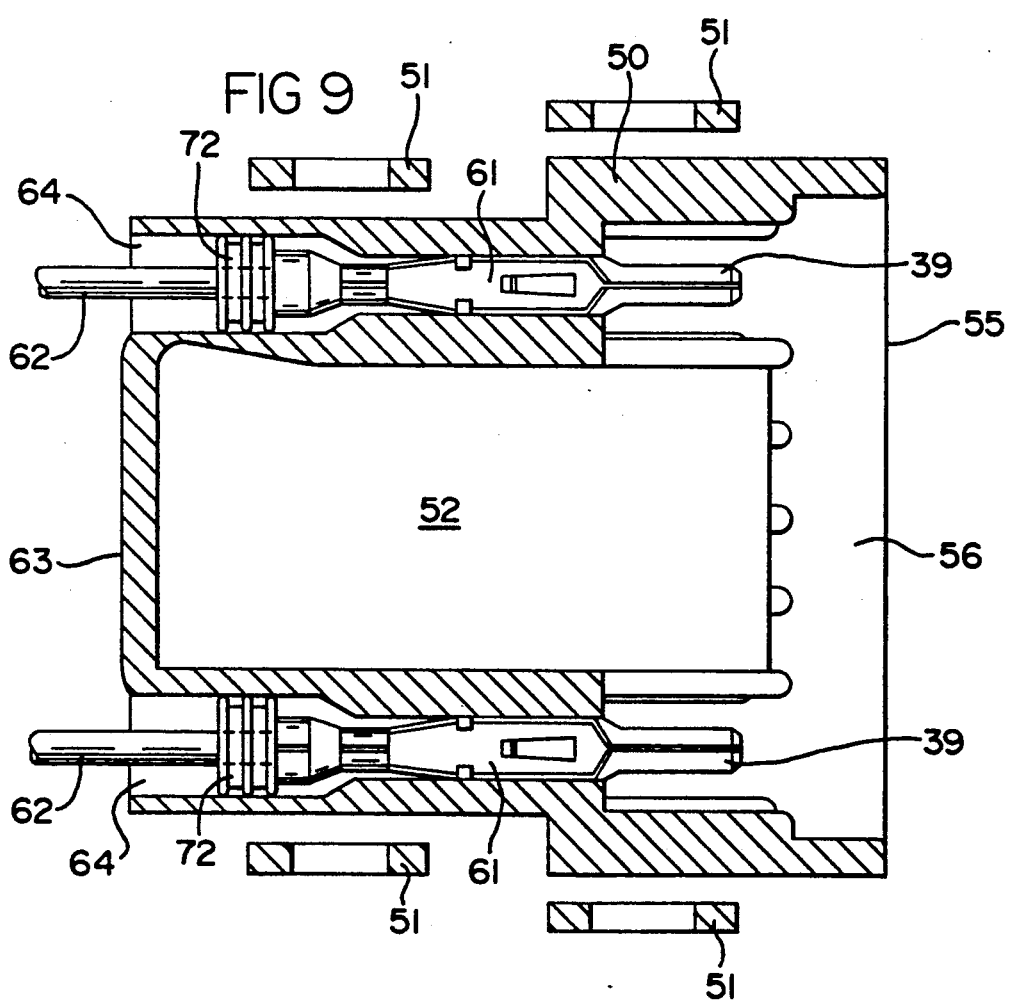

ELECTRIC MOTOR, ESPECIALLY WIPER MOTOR FOR DRIVING A WINDSHIELD WIPER SYSTEM IN A MOTOR VEHICLE

TECHNICAL FIELD

This invention relates to an electric motor, especially a wiper motor for driving a windshield wiper system in a motor vehicle.

BACKGROUND OF THE INVENTION

A known wiper motor of this kind includes a gear housing having a cover and several plug contacts, which are especially arranged substantially in parallel to the gear housing. Several of the plug contacts are fixed on the gear housing, in particular on the cover and at least one of them is connected with a motor current supply lead and is fitted in a plug housing. The plug contacts are fixed on the gear housing by means of a plastic member directly injection molded onto the metallic cover of the gear housing. The plug housing, into which two motor current supply leads are inserted, is carried by the injection molded plastic member and fixed thereto. All plug contacts of the known electric motor are to a far-reaching extent exposed to environmental influences and also to splashing water. The gear housing can also be leaky in the area in which the plug contacts are fixed on it.

SUMMARY OF THE INVENTION

The present invention provides an electric motor in which the impermeability of the gear housing and the protection against corrosion of the plug contacts are improved.

This is accomplished according to the invention by an electric motor which has a plug housing with an opening having a rim surrounding the opening. The plug contacts fixed on the gear housing reach into the plug housing through the opening in the plug housing as the plug housing rests firmly on the gear housing.

Thus in an electric motor according to the invention the plug housing rests directly against the gear housing, in particular on the cover of the gear housing. Thus the area of the gear housing in which the plug contacts are fixed on the gear housing are protected by the plug housing against direct access of splashing water. In this way, the protection against corrosion of the plug contacts is improved. A better impermeability of the gear housing is also provided. Normally the gear housing has openings in the area of the connector fixations, through which openings the various plug contacts extend into the gear housing interior or which openings serve to anchor the plastic member injection molded onto it.

The plug-in terminations of the plug contacts are advantageously positioned within an edge of the gear housing. The edge of the opening in the plug housing permits passage of the plug-in terminations of the plug contacts, so that during the assembly the plug contacts can be easily brought into the plug housing through the opening. Nevertheless the rim of the opening can without difficulty rest upon the gear housing.

The plug contacts extending into the gear housing interior are connected with sliding springs which are part of a position switch of the electric motor. Several of the plug contacts fixed on the gear housing can extend close to an edge of the gear housing into its interior. In order to prevent the plug-in terminations of the plug contacts from projecting over an edge of the gear housing these plug contacts suitably extend from the openings in the opposite direction towards the close edge of the gear housing.

The plug contacts on the electric motor are in a known manner connected with mating plugs inserted in a mating plug housing. For this mating plug housing a seat is created on the electric motor. It is also known to provide in electric plug connections between the two plug housings a sealing resting against a seat surrounding the mating plug housing and formed onto the interior of the plug housing. In order to ensure that this sealing is fully effective in an electric motor according to the invention, the plug housing in the area of the plug-in terminations, especailly in front of the plug-in terminations of the plug contacts, forms a chamber for a mating plug housing, which chamber is open in the plug-in direction and perpendicularly thereto closed all around. In comparison with the known electric motor, in which the chamber is formed in two parts by the holding member injection molded onto the cover and by the plug housing, this construction has the advantage of having no burrs or grooves on the interior of the chamber which could affect the effectiveness of the sealing.

If the plug housing has a collar surrounding its opening a defined rest on the gear housing is achieved. The spacing of the plug housing from the gear housing is defined by the height of the collar. If, just as in the case of the known electric motor, the gear housing has a plastic holding member for fixing and/or supporting the plug contacts fastened on the gear housing the holding member is advantageously positioned within the opening of the plug housing. A sealing, which is suitably provided between plug housing and gear housing, can be preliminarily fixed. The holding member advantageously includes a circumferential collar to fix the position of plug housing and sealing and improve the impermeability of the plug housing interior.

In another aspect of the present invention, the plug contacts fixed on the gear housing are clamped and guided in such a way that their plug-in terminations occupy a given position reliably.

BRIEF DESCRIPTION OF THE DRAWINGS

One embodiment of an electric motor according to the present invention is shown in the drawings. The invention will be described in detail by way of the drawings, in which FIG. 2 is a view into the plug housing in the direction of arrow A of FIG. 1, FIG. 6 is a view of the side of the plug housing facing the cover, FIG. 7 is a section taken on the line VII—VII of FIG. 6, FIG. 9 is a section taken on the line IX—IX of FIG. 7

Figure 1:
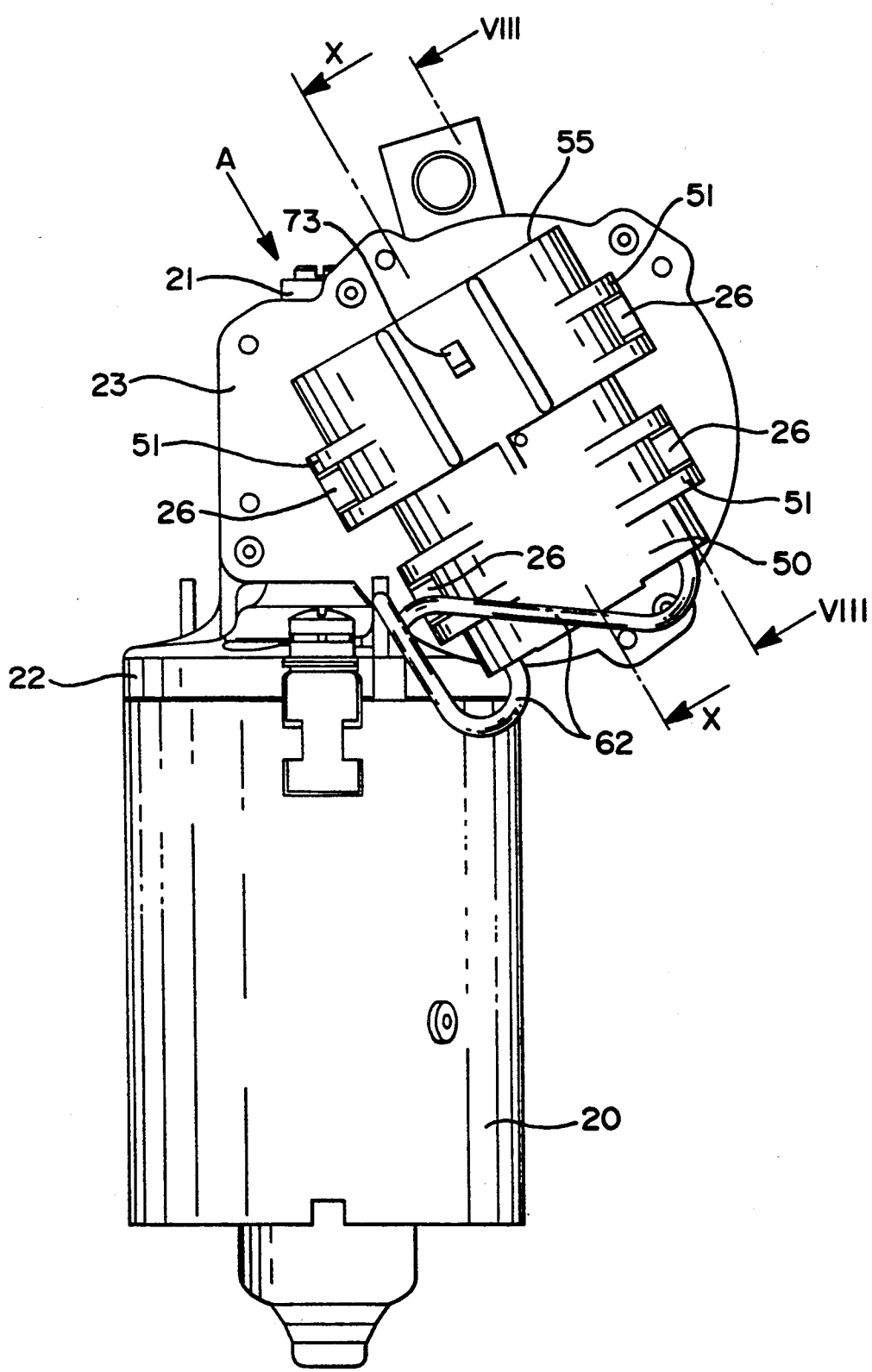
FIG. 1 shows the present invention in a general view in the direction of the gear housing cover with a plug housing in place.
Figure 3:
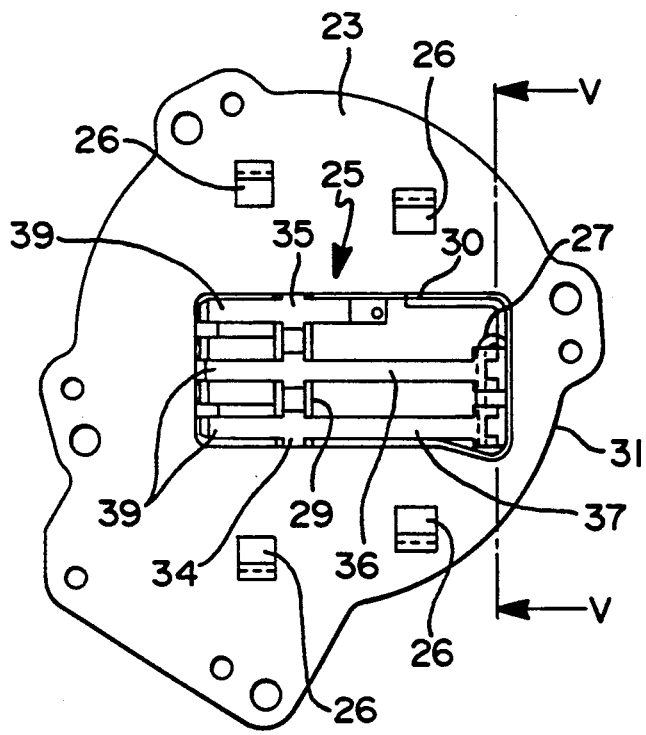
FIG. 3 is a view onto the cover in the direction of the general view according to FIG. 1 without the plug housing in place.
Figure 5:
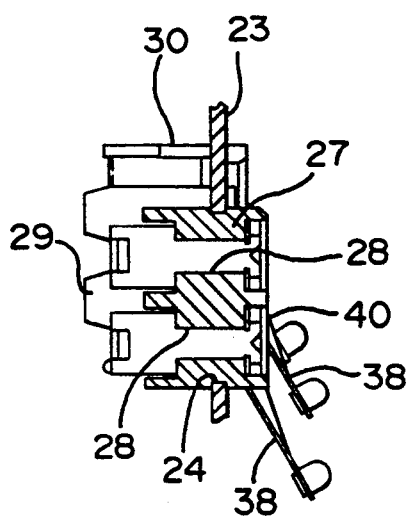
FIG. 5 is a section taken on the line V—V of FIG. 3.

The wiper motor shown in FIG. 1 is provided for driving windshield wiper systems in motor vehicles. A cup-shaped gear housing 21 with an endshield 22 is flanged onto the actual cylindrical motor housing 20. The gear housing 21 is closed by a cover 23 punched out from a sheet metal, which cover is regarded as being part of the gear housing 21.

Figure 4:
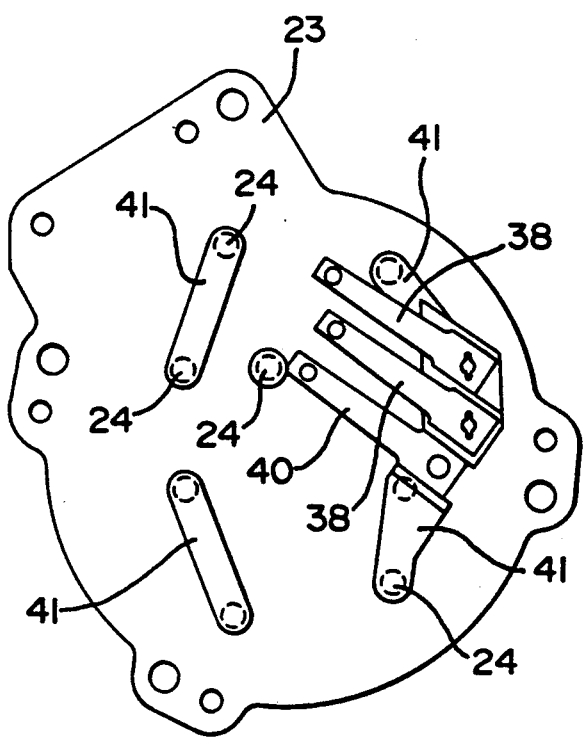
FIG. 4 is a view of the cover in a direction opposite to that of FIG. 3.
Figure 8:
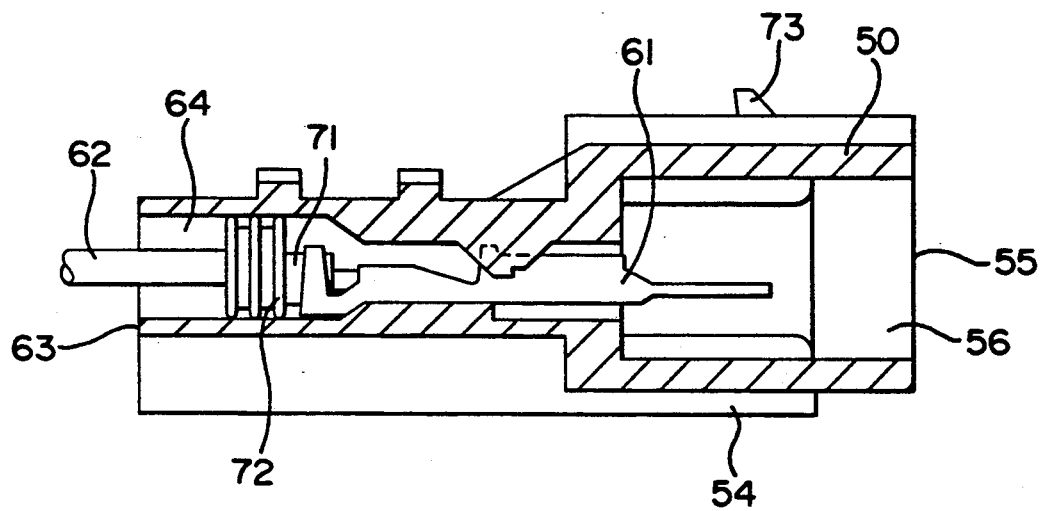
FIG. 8 is a section through the plug housing taken on the line VIII—VIII of FIG. 1.

When being punched out, the cover is provided with several apertures of which the apertures 24 serve to anchor a plastic holding member directly injection molded onto the metallic cover and several locking hooks 26. In FIG. 4 the apertures 24 are drawn as small circles with broken lines.

The holding member 25 has three functionally different portions. The first portion of the holding member 25 includes a dome 27 which extends upwardly at the outside of the cover, but through an aperture 24 also reaches to the other side of the cover. The dome has two channels 28. The dome 27 is positioned close to the rim 31 of the cover 23. The second portion of the holding member includes a support 29 which is closer to the middle of the cover 23 and also extends upwardly at the outside of the cover 23. The third portion of the holding member 25 is a collar 30 which and encloses the dome 27 and the support 29 at the outside of the cover 23.

Three plug contacts 35, 36 and 37 are held in position on the holding member. The two plug contacts 36 and 37 are conducted through the channels 28 of the dome 27 to the inside of the cover 23 by two portions extending perpendicularly to the cover 23. At the inside of the cover a sliding spring 38 is fixed on each of the plug contacts 36 and 37. From the dome 27 the plug contacts 36 and 37 extend parallel to the cover 23 to the support 29 and with their plug-in terminations 39 they project beyond the support 29. On the support 29 and thus on the foot of their plug-in terminations the two plug contacts 36 and 37 are fixed in their longitudinal direction and in a direction parallel to the cover and perpendicularly to their longitudinal direction. Lateral projections 34 on the plug contacts, positioned between projections on the support 29, serve for fixing in the longitudinal direction.

In its plug-in termination 39 and in the area of the support 29 the plug contact 35 has the same shape as the two plug contacts 36 and 37. Plug contact 35 therefore is fixed by the support 29 in the same way as the plug contacts 36 and 37. However in contrast to the plug contacts 36 and 37, plug contact 35 is bent towards the cover behind the support 29 and, within the collar 30, welded to the cover 23. A sliding spring 40 is fixed at the inside of the cover 23, which is electrically connected with the plug contact 35.

The plug contacts 36 and 37 extend from the dome 27 toward the center of the cover 23. As a result, in spite of the proximity of the dome 27 to the rim 31 of the cover 23, plug-in terminations 39 do not project over the cover 23. The advantage of this will become clear in the description of the plug housing.

The four locking hooks 26 are located outside the collar 30 of the holding member 25 and spaced from it. Each locking hook 26 extends through an aperture 24 to the inside of the cover 23 and is there integrally connected with the holding member 25 via a plastic bridge 41. This facilitates the injection molding process of the locking hooks 26 onto the cover 23.

The locking hooks 26 serve to fix a plug housing 50 on the cover 23. The plug housing 50 is a flat hollow body which at the outside has four yokes 51 directed towards the cover 23. Each of these yokes grips behind a locking hook 26.

At the side facing the cover 23 the plug housing 50 has an opening 52 with a circumferential rim 53. The opening has a substantially rectangular contour having a length and width which permits the plug contacts 35, 36 and 37 together with the holding member 25 to reach the interior of the plug housing 50 through the opening 52 by simply putting the plug housing 50 on the cover 23. The opening is surrounded by a collar 54 the height of which depends on the spacing of the plug housing 50 from the cover 23 and passes in front of the plug-in terminations 39 of the plug contacts and is completely located in the outer contour of the cover 23. Because the plug-in terminations 39 do not project over the cover 23 a simple assembly of the plug housing is possible with good sealing between cover 23 and plug housing 50.

Figure 10:
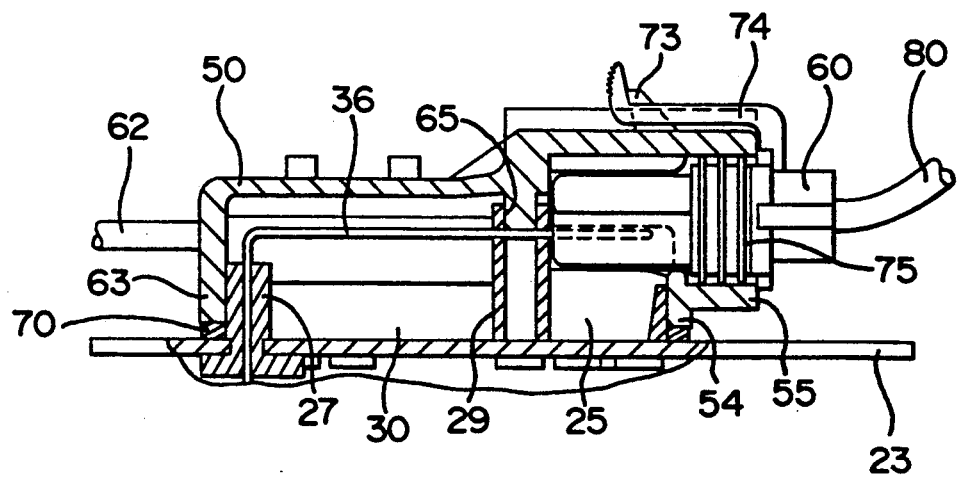
FIG. 10 is a section through the cover and the plug housing taken on the line X—X of FIG. 1.

The front side 55 of the plug housing 50, which can be seen in a view in the direction of arrow A, is spaced apart from the opening 52 and is open, so that through the front side a chamber 56 of the plug housing is accessible for a mating plug housing 60 as seen in FIG. 10. When viewed in a direction perpendicular to the plug-in direction of the mating plug housing, the chamber 56 is completely closed behind the front side 55 and the outer walls are formed by the plug housing 50 alone. Thus, the inside of the chamber 56 is planar and without burrs or gaps.

In addition to the plug contacts 35, 36 and 37 two plug contacts 61 project into the chamber 56. Contacts 61 are positioned laterally of the opening 52 in channels 64 of the plug housing 50 are connected and to cable 62 a cable 62. Cable 62 leaves the respective channel on the front side 63 of the plug housing. Front side 63 is located opposite the front side 55. Apart from the two channels the front side 63 is closed. The cables are motor current supply leads which are conducted into the housing 20 of the electric motor.

At the rear end of the chamber 56 a web 65 is formed onto the top side of the plug housing 50. Web 65 is positioned above the support 29 of the holding member 25 when the plug housing is mounted on the cover 23. The plug contacts 35, 36, and 37 are clamped between the support 29 and the web 65.

In the assembly, at first the plug contacts 36 and 37 are entered into the channels 28 of the holding member and put on the support 29. The plug contact 35 is put onto the support 29 and welded with the cover 23. At the inside of the cover 23 the sliding springs 38 and 40 are fixed on the plug contacts 36 and 37 or on the cover respectively. In order to achieve a very good seal between the cover 23 and the collar 54 of the plug housing 50, a sealing 70 is put on the cover 23 around the collar 30 of the holding member 25. Thereafter the plug housing 50, by its opening 52, is slipped over the holding member 25 thereby slightly pressing the sealing 70 until the yokes 51 are locked on the locking hooks. As can be seen from FIG. 10 now neither dust nor splashing water can penetrate between the cover 23 and the plug housing 50 to the plug contacts and through the channels 28 of the holding member 25 into the interior of the gear housing 21.

When the plug housing 50 is fixed, the plug contacts 61 with the connected cables 62 are pushed from the front side 63 into the channels 64 of the plug housing 50 and locked therein. On each plug contact 61 is clamped a sealing 72 surrounding the cable 62 by means of a collar 71. Sealing 72 closes the respective channel 64 to the outside. Thus dust or water cannot enter the plug housing 50 through the channels 64.

As can be seen from FIG. 2 the plug contacts 35, 36, 37 and 61 are all located at the same level. For a connection with the motor vehicle wiring the mating plug housing 60 is pushed into the chamber 56 from the front side 55 of the plug housing 50 to the web 65. In this way, the plug-in terminations 39 of the plug contacts are brought into electric contact with mating plugs not shown in detail fixed in the mating plug housing. A yoke 74 of the housing 60 gripping over plug housing 50 and engaging behind a nose 73 secures the housing 60 against an inadvertent release. The mating plug housing 60 is surrounded by a sealing 75 which, when the housing 60 has been inserted in the plug housing 50, rests against the front side 55 at the inside of the chamber 56 behind the front side 55. Because, as has been illustrated, there are no burrs or grooves at the inside of the chamber 56 the sealing 75 is very effective. Now dirt cannot enter between the plug housing 50 and the mating plug housing 60 to the plug contacts and mating plugs.

In a manner similar to the plug contacts 61 the mating plugs fixed in the housing 60 each clamp a sealing which surrounds the cable 80 connected with the respective mating plug and seals the passage in the mating plug housing 60, in which the respective mating plug is positioned. Thus dirt cannot enter the plug housing 50 through the passages in the mating plug housing 60 and reach the plug contacts and mating plugs. The electric connection between plug contacts and mating plugs is therefore to a high extent protected against dirt accumulation and corrosion. An accumulation of dirt in the interior gear housing is also effectively prevented.

What is claimed is:

1. Windshield wiper motor apparatus comprising:
   a gear housing having a cover;
   a plug housing formed separately from said gear housing, said plug housing having an opening defined by a rim and attached to said cover of said gear housing to position said opening at said cover and to seal said rim of said plug housing directly against said cover of said gear housing;
   a sealing member between said rim of said plug housing and said cover of said gear housing;
   a plurality of plug contacts mounted on said cover of said gear housing and extending parallel to said cover within said opening in said plug housing;
   and at least one plug contact fitted within said plug housing and adapted for connection with a motor current supply lead.

2. Windshield wiper motor apparatus according to claim 1 wherein each of said plug contacts mounted on said cover of said gear housing has a free end adapted for connection with a mating plug and said free ends of said plug contacts are within the edge of said cover.

3. Windshield wiper motor apparatus according to claim 2 wherein selected ones of said plug contacts mounted on said cover of said gear housing extend into the interior of said gear housing through passages in said cover near said edge of said cover and those portions of said plug contacts extending parallel to said cover extend away from said edge.

4. Windshield wiper motor apparatus according to claim 3 wherein said plug housing has an open chamber adapted to receive said mating plug and said free ends of said plug contacts and said one plug fitted within said plug housing extend into said chamber.

5. A windshield wiper motor apparatus comprising:
   a gear housing having a cover;
   a plug housing formed separately from said gear housing, said plug housing having an opening defined by a rim and attached to said cover of said gear housing to position said opening at said cover and to seal said rim of said plug housing directly against said cover of said gear housing, said rim of said plug housing raised to form a collar;
   a plurality of plug contacts mounted on said cover of said gear housing and extending parallel to said cover within said opening in said plug housing;
   and at least one plug contact fitted within said plug housing and adapted for connection with a motor current supply lead.

6. A windshield wiper motor apparatus comprising:
   a gear housing having a cover;
   a plug housing formed separately from said gear housing, said plug housing having an opening defined by a rim and attached to said cover of said gear housing to position said opening at said cover and to seal said rim of said plug housing directly against said cover of said gear housing;
   a plurality of plug contacts mounted on said cover of said gear housing and extending parallel to said cover within said opening in said plug housing;
   at least one plug contact fitted within said plug housing and adapted for connection with a motor current supply lead; and
   a plastic holding member by which said plug contacts are mounted on said cover of said gear housing and said plastic holding member is positioned within said opening in said plug housing.

7. Windshield wiper motor apparatus according to claim 6 further including a sealing member between said rim of said plug housing and said cover of said gear housing and said sealing member is attached to said holding member.

8. Windshield wiper motor/apparatus according to claim 7 wherein said holding member has a circumferential collar.

9. Windshield wiper motor apparatus according to claim 6 wherein said holding member includes a support and said plug contacts mounted on said cover of said gear housing are clamped between said support and a wall of said plug housing.

10. Windshield wiper motor apparatus according to claim 6 wherein said plug contacts mounted on said cover of said gear housing are fixed in position on a portion of said holding member parallel to said cover and perpendicular to the longitudinal direction of said plug contacts.

11. Windshield wiper motor apparatus according to claim 6 wherein said plug contacts mounted on said cover of said gear housing are fixed in their longitudinal direction by said holding member.

12. Windshield wiper motor apparatus according to claim 11 wherein said plug contacts mounted on said cover of said gear housing each have a projection on at least one lateral edge which engage said holding member to fix said plug contacts in their longitudinal direction.

13. Windshield wiper motor apparatus according to claim 6 wherein said cover of said gear housing has openings and said holding member is an injection-molded part which extends through said openings in said cover.

14. Windshield wiper motor apparatus according to claim 13 wherein said holding member includes portions inside said gear housing connecting parts of said holding member extending through said openings in said cover.

* * * * *